United States Patent [19]

Borth

[11] Patent Number: 4,852,090

[45] Date of Patent: Jul. 25, 1989

[54] TDMA COMMUNICATIONS SYSTEM WITH ADAPTIVE EQUALIZATION

[75] Inventor: David E. Borth, Palatine, Ill.

[73] Assignee: Motorola, Inc., Schaumburg, Ill.

[21] Appl. No.: 181,020

[22] Filed: Apr. 13, 1988

Related U.S. Application Data

[63] Continuation of Ser. No. 9,973, Feb. 2, 1987, abandoned.

[51] Int. Cl.⁴ ............................................ H04J 3/06
[52] U.S. Cl. .................................. 370/104; 375/101; 455/65
[58] Field of Search ............... 370/95, 103, 104, 100; 375/40, 101, 14, 58, 114, 106; 455/65

[56] References Cited

U.S. PATENT DOCUMENTS

| | | | |
|---|---|---|---|
| 3,646,441 | 2/1972 | Magnuski | 325/13 |
| 4,339,824 | 7/1982 | Tanimoto | 370/104 |
| 4,457,007 | 1/1984 | Gutleber | 375/102 |
| 4,483,000 | 11/1984 | Yamamoto et al. | 370/95 |
| 4,488,296 | 12/1984 | Yamamoto et al. | 370/104 |
| 4,587,662 | 5/1986 | Langwellpott | 375/1 |
| 4,599,732 | 7/1986 | LeFever | 375/101 |
| 4,641,318 | 2/1987 | Addeo | 375/58 |
| 4,686,673 | 8/1987 | Hotta | 370/104 |
| 4,688,210 | 8/1987 | Eizenhofer et al. | 370/18 |
| 4,694,473 | 9/1987 | Etoh | 375/116 |
| 4,733,402 | 3/1988 | Monsen | 375/14 |

OTHER PUBLICATIONS

Bohm, Dr. Ing. Manfred, "Mobile Telephone for Everyone Through Digital Technology", *Personal Communications Technology*, (Nov. 1985), pp. 44–46.

Eckert, Klaus-Dieter et al., "The Fully Cellular Radio Telephone System CD 900", *Nordic Seminar on Digital Land Mobile Radiocommunication*, (Feb. 5–7, 1985 Espoo, Finland), pp. 241–259.

Falconer, David D., "Application of Passband Decision Feedback Equalization in Two–Dimensional Data Communication Systems", *IEEE Transactions on Communications*, (Oct. 1976), pp. 1159–1166.

Kinoshita, Kota et al., "Digital Mobile Radio Telephone System Using TD/FDMA Scheme" *IEEE International Conference on Communications*, (Jun. 14–18, 1981, Denver, Colo.), pp. 23.4.1–23.4.5.

Kreutzer, Peter, "Experimental Investigations on a Digital Mobile Radio Telephone System Using TDMA and Spread Spectrum Techniques", Nordic Seminar on Digital Land Mobile Radio Communications (DMRI), Feb. 5–7, 1985, Espoo, Finland), pp. 287–293.

Kuisma, Erkki, "Performance Analysis of a Digital Mobile Radio System Based on Narrow Band TDMA", *Second Nordic Seminar on Digital Land Mobile Radio Communication 1*, (DMR II) (Oct. 14–16, 1986) pp. 115–118.

(List continued on next page.)

*Primary Examiner*—Robert L. Griffin
*Assistant Examiner*—Frank M. Scutch, III
*Attorney, Agent, or Firm*—Douglas A. Boehm; Steven G. Parmelee; Anthony J. Sarli, Jr.

[57] ABSTRACT

A method and means for reducing multipath interference distortion in a time-division multiple access (TDMA) communications system is disclosed. A transmitting station (100) formats one or more equalizer synchronization words with a first user's data word, time-multiplexes this formatted user message with at least one other user message, and transmits the combined signal. The receiving station (200) receives the transmitted TDMA signal, de-multiplexes the first user message from the other user messages, and equalizes the time delay spread characteristics of the data word portion of the first user message (or a stored version of such) in response to this de-multiplexing. Performing the adaptive equalization process more than once per user time slot provides an even higher data throughout for the system. Storing the first user message in a data buffer permits the adaptive equalization process to be performed in non-real time, thereby lowering the required signal processing data rate in any particular receiver.

28 Claims, 4 Drawing Sheets

OTHER PUBLICATIONS

Leuenberger, Kurt J., "Digital Radio Systems Examined—Part I, General State of the Art", *Microwave Systems News and Communications Technology*, vol. 16, No. 1, (Jan. 1986), pp. 81–92.

Price, R. et al., "A Communication Technique for Multipath Channels", *Proc. IRE*, vol. 46, (Mar. 1958), pp. 555–570.

Qureshi, Shahid, "Adaptive Equalization", *IEEE Communications Magazine*, (Mar. 1982), pp. 9–16.

Stjernvall, Jan-Erik et al., "Performance of an Experimental FD/TDMA Digital Radio System", *Second Nordic Seminar on Digital Land Mobile Radiocommunications*, (DMR II), pp. 107–109.

Swerup, Jan et al., "Digital Cellular", *Personal Communications Technology*, (May 1986), pp. 6–12.

Uddenfeldt, Jan et al., "A Digital FD/TDMA System for a New Generation Cellular Radio", *Second Nordic Seminar on Digital Land Mobile Radiocommunications*, (DMR II), (Oct. 14–16, 1986), pp. 99–105.

Weaver, C. F. et al., "The Implementation of Adaptive Decision Feedback Equalization of Multipath Distortion in Microwave Radio", *IEEE Global Communications Conference*, pp. 1548–1552.

TDMA COMMUNICATIONS SYSTEM WITH ADAPTIVE EQUALIZATION

CROSS REFERENCE TO RELATED APPLICATIONS

This is a continuation of application Ser. No. 009,973, filed Feb. 2, 1987, now abandoned.

BACKGROUND OF THE INVENTION

The present invention generally relates to two-way radio frequency (RF) communications, and, more particularly, is directed to a method for reducing multipath interference distortion in a time-division multiple access (TDMA) communications system.

Recently, there has been an increased demand for data communications and digitally-encrypted voice communications over land mobile radio channels. Since the radio frequency spectrum is inherently limited, one must devise new system concepts and organizational features to accommodate the increased demand for mobile and portable radio communications services.

Accordingly, there has been a renewed interest in the research and development of a variety of narrowband amplitude modulation (AM) and frequency modulation (FM) communications systems. A reduction in channel spacing to 12.5 kHz has been achieved through the use of single sideband (SSB) AM communications systems, e.g., Eastmond, et al., U.S. Pat. No. 4,541,118. Moreover, reduction of occupied bandwidth to less than 6.25 kHz is feasible with linear predictive coding (LPC) voice encoding techniques for very high frequency (VHF) FM land mobile radios, e.g., see Carney and Linder "A Digital Mobile Radio for 5-6 kHz Channels", *IEEE International Conference on Communications,* Philadelphia, PA, June 13-17, 1982.

Geographical co-channel reuse techniques and multiple access schemes are also used to improve the efficiency of spectrum utilization. For example, trunking concepts, which involve the automatic sharing of a block of communications channels among a large number of users have been known and used extensively in the telephone industry and in 800 MHz FM radio systems, e.g., Lynk, Jr. et al., U.S. Pat. No. 4,012,597. Moreover, cellular radiotelephone systems were developed to reuse radio channels in a given geographic area by dividing the whole coverage area into contiguous smaller coverage areas (cells) using low power transmitters and receivers within the cell, e.g., Cooper, et al., U.S. Pat. No. 3,906,166. Trunking and cellular systems are two examples of frequency-division multiple access (FDMA) systems.

Time-division multiple access (TDMA) is an additional method of achieving more efficient spectrum utilization. TDMA has been used in point-to-point microwave telephone links and in satellite communications systems for some time. Unlike high-capacity mobile radiotelephone FDMA systems wherein a large number of users are assigned different frequency RF channels, in a TDMA system, each user is assigned a different time slot on the same frequency channel.

A digital FDMA system offers two to three times better spectrum efficiency than analog FM, and can also provide additional voice security and data communications services which can co-exist with present analog systems. Nevertheless, FDMA systems exhibit several practical limitations, such as increased equipment costs, tighter specification tolerances, increased occurrences of intermodulation interference, and complicated channel control. See K. Kinoshita, et al. "Digital Mobile Radio Telephone System Using TD/FDMA Scheme", *IEEE Transactions on Vehicular Technology,* Vol. VT-31 pp. 153-7, November 1982.

On the other hand, TDMA systems enjoy certain advantages over FDMA approaches. First, variable data rate transmissions are readily accommodated with TDMA systems through the use of multiple, adjacent time slots. Second, TDMA base station transmitters allow the use of a common power amplifier without increasing the intermodulation distortion present with FDMA systems. Furthermore, the size and cost of TDMA mobile and portable transceivers can be reduced through the use of lower speed signal processing devices, since receive and transmit bursts appear at different points in time on the same RF channel.

In order to achieve spectral efficiencies comparable to those obtainable with FDMA systems, TDMA systems must average the required time slot separations over many channels, i.e., at least five. For reasonable quality speech, i.e., data rates greater than 9.6 kbps (kilobits per second), the raw information data rate of TDMA systems must be at least 50 kbps. Allowing a data rate expansion factor of 2 to accommodate channel error correction coding methods, a data rate of at least 100 kbps is then required for a single TDMA channel.

However, multipath interference significantly limits the maximum permissible data rate for a land mobile RF channel. Multipath interference is usually described in terms of two effects—Rayleigh fading, and intersymbol interference. Rayleigh fading pertains to the relative RF phases of the signals received over various transmission paths. Since the total receive signal is a vector sum of the individual multipath signals received, the signal strength will exhibit large variations depending upon the frequency, echo amplitudes, and relative vehicle speeds. Intersymbol interference is related solely to the time delay differences between the propagation paths as seen at the TDMA receiver. Intersymbol interference places a limit on the maximum data rate at which digital information can be sent, since the TDMA receiver may simultaneously be supplied with various overlapping informational elements resulting in a smearing of the intelligence.

For land mobile radio communications, the channel delay spread (i.e., the r.m.s. value of the time spread in received energy of a transmitted impulse) varies from 200 nanoseconds for suburban locations to 5 microseconds for urban locations. An approximation of the transmission rate permissible with intersymbol interference is then:

*maximum transmission rate=0.2/delay spread*

See W. C. Y. Lee, *Mobile Communications Engineering,* New York: McGraw-Hill, 1982, p.45.) Hence, the maximum permissible data rate for a land mobile radio channel without encountering significant intersymbol interference degradation is in the range of 80 kbps to 1 megabit per second (Mbps). This result limits the number of 20 kbps time slots to a maximum of only four. Thus, in a land mobile radio system, the significant advantages of TDMA over FDMA may never be achieved in practice.

A need, therefore, exists to provide a method and means for allowing transmission of data over land mobile radio channels at transmission rates in excess over those normally allowed by the multipath characteristics of the RF channel.

SUMMARY OF THE INVENTION

Accordingly, a general object of the present invention is to provide an improved TDMA communications system having reduced multipath interference distortion.

Another object of the present invention is to accommodate for different multipath characteristics of different users in a TDMA system.

A further object of the present invention is to provide a method to compensate for the multipath characteristics of a channel without exceeding the signal processing capabilities of the mobile receiver.

These and other objects are achieved by the present invention which, briefly described, is a time-division multiplex communication system having a transmitting station and a receiving station; the transmitting station formatting one or more equalizer synchronization words with a first user's data word, and time-multiplexing this formatted user message with at least one other message to form a transmitted TDMA signal; the receiving station de-multiplexing the first user message from the received TDM signal, and equalizing the time-delay spread characteristics of the data word portion of the first user message (or of a stored version of such) in response to the de-multiplexing, thus compensating for intersymbol interference by reinserting different delays into the received data path.

In the preferred embodiment, a TDMA transmitter inserts the known synchronization word into each user time slot to permit measurement of the time delay spread characteristics of the RF channel without having to account for channel variations over the interval. This channel measurement technique permits adaptive equalization in moving vehicles at moderate speeds. The present scheme also accommodates for multiple users experiencing different multipath channel characteristics, as would occur in a mobile TDMA system. Furthermore, additional synchronization words, or synchronization "update" words, may be inserted into the user's data word itself to achieve even higher data throughput in existing TDMA systems. Still further, the received data message may be stored such that the adaptive equalization process may be performed in non-real time (i.e., during other user's time slots), thereby permitting the use of slower and more cost effective signal processing in any particular transceiver.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like-referenced numerals identify like elements, and in which:

DETAILED DESCRIPTION OF THE PREFERRED EMBODIMENT

In its simplest form, the time-division multiple access (TDMA) system of the present invention is comprised of a transmitting station capable of time-multiplexing messages from at least two users, and one or more receiving stations capable of receiving at least one of the time-multiplexed messages. As used herein, a mobile unit is defined as a radio transceiver typically carried in vehicles; a portable unit as typically carried about a person; and a base station unit as typically a permanent or semi-permanent installation at a fixed location. Mobile units and portable units are hereinafter collectively referred to as remote units. Although the present invention was intended for use in a digital cellular mobile radiotelephone system in which all stations transmit and receive in the duplex mode, it is contemplated that receive-only or transmit-only devices may also be readily implemented. Such receive-only devices capable of operating in the present TDMA communication system include, but are not limited to, data display pagers, tone pagers, or tone-and-voice pagers. For purposes of understanding the operation of the present invention, such transmit-only and receive-only devices are illustrated in the figures.

Figure 1:
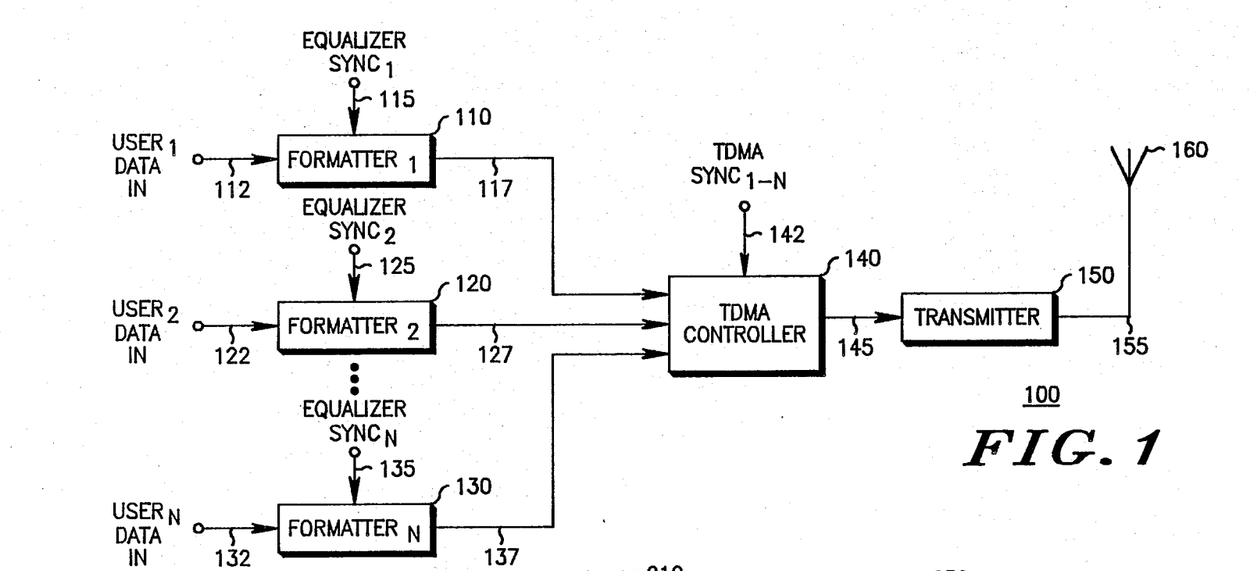
FIG. 1 is a general block diagram of a TDMA transmitting station for use with the present invention.

Referring now to FIG. 1, there is shown a block diagram of TDMA transmitting station 100. Digital speech or data, 112, 122, 132, is input from a number N of users into formatter blocks 110, 120, 130, along with corresponding equalizer synchronization words 115, 125, 135, respectively. Formatters 1 through N serve to interleave a predetermined number of data bits of the input user data with one or more of each user's appropriate equalizer synchronization word. In the preferred embodiment, the function of formatters 110, 120, and 130 are performed in software in a microprocessor. A representative sync word/data word interleaving mechanism which may be utilized as formatters 110, 120, 130, may be found in J. E. Vander Mey and G. D. Forney, Jr., "Application of LSI Microprocessors in Data Network Hardware," *Proc. ICC '76*, Vol. 3, pp. 48.16–19, June 14–16, 1976. The content of the synchronization word will be further described in FIG. 3b. Once each user's data is interleaved in time with its synchronization word, each formatter outputs the combination as a user message to TDMA controller 140 via lines 117, 127, 137.

TDMA controller 140 performs the function of time-multiplexing each user message with the other user messages to form a TDMA signal. In addition, TDMA controller 140 adds TDMA $sync_{1-N}$ signal 142 to each of the N time slots. The output of TDMA controller at 145 is a TDMA signal consisting of a number N of user messages as described later in FIG. 3a. Again, in the preferred embodiment, the time-multiplexing function is performed in software. Alternatively, various hardware representations, e.g., a time-controlled switch, may also be used. For example, an alternative time-multiplexing implementation is described in the Motorola MC14416 time slot assigner circuit IC data sheet.

Figure 2:
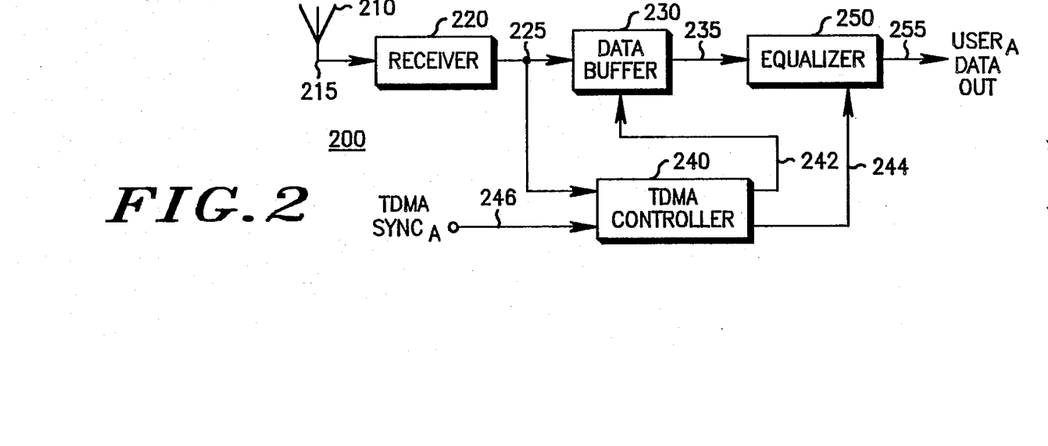
FIG. 2 is a general block diagram of a mobile or portable TDMA receiving station illustrating the adaptive equalization technique according to the present invention.
Figure 4A:
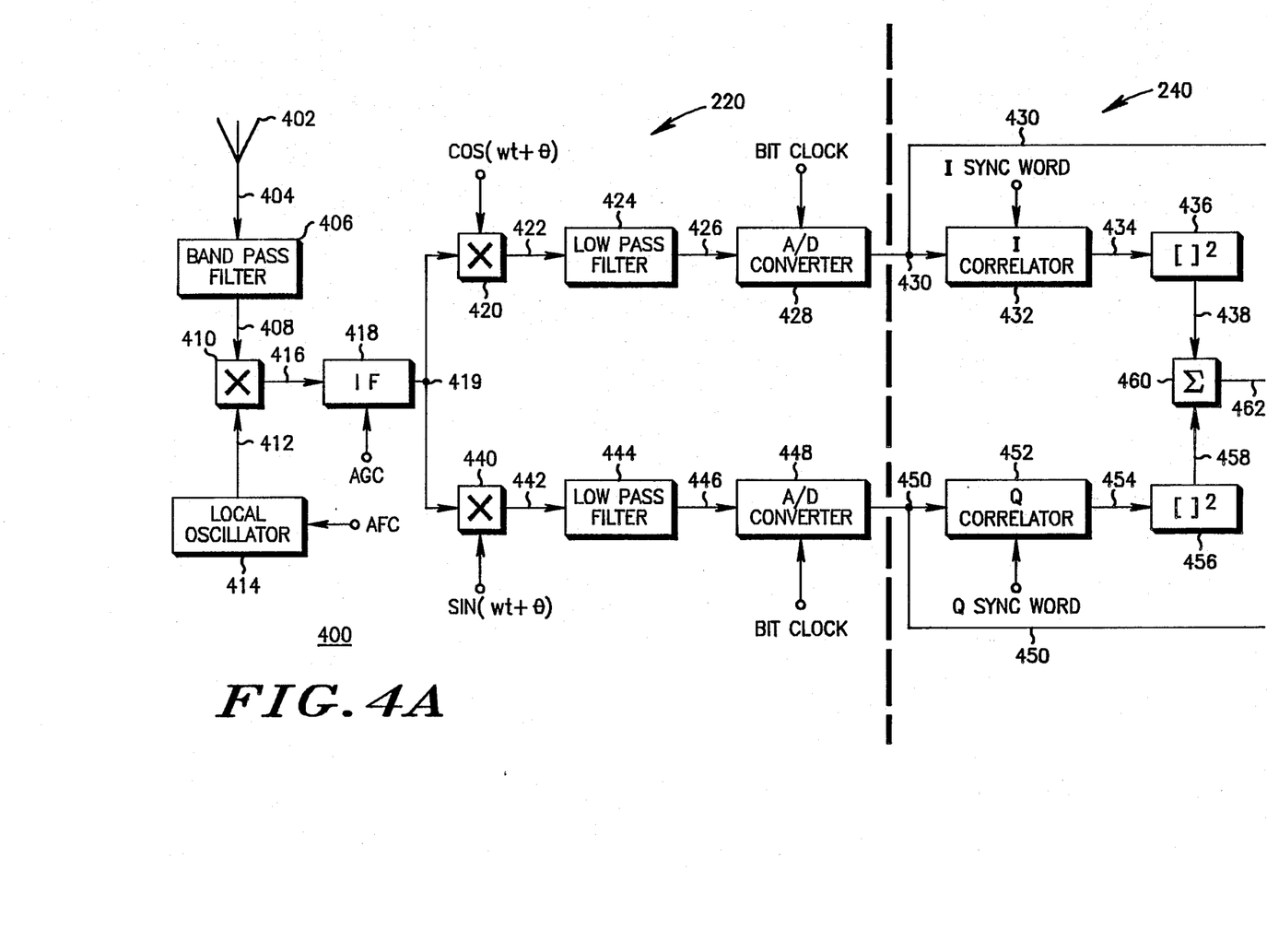
FIGS. 4a and 4b represent a detailed block diagram of the TDMA receiving station of FIG. 2.

The TDMA signal is then applied to transmitter 150 for RF transmission via line 155 to antenna 160. Transmitter 150 may be any suitable transmitter compatible with the chosen system format. A mobile transmitter which may be used in the present invention is described in Motorola Instruction Manual 68P81070E40 entitled, "Dyna T·A·C· Cellular Mobile Telephone". In the preferred embodiment, transmitter 150 outputs GMSK-modulated data at 900 MHz within a 300 kHz bandwidth channel FIG. 2 illustrates TDMA receiving station 200. The TDMA signal is received at antenna 210 and fed to receiver 220 via line 215. Receiver 220 receives and demodulates the RF carrier in a manner compatible with the system implementation. For example, a representative portable radio receiver may be found in Motorola Instruction Manual 68P81071E55 entitled "Dyna T·A·C· 8500XL Cellular Portable Telephone". Furthermore, a detailed block diagram of a quadrature receiver is described in FIG. 4.

Figure 3A:
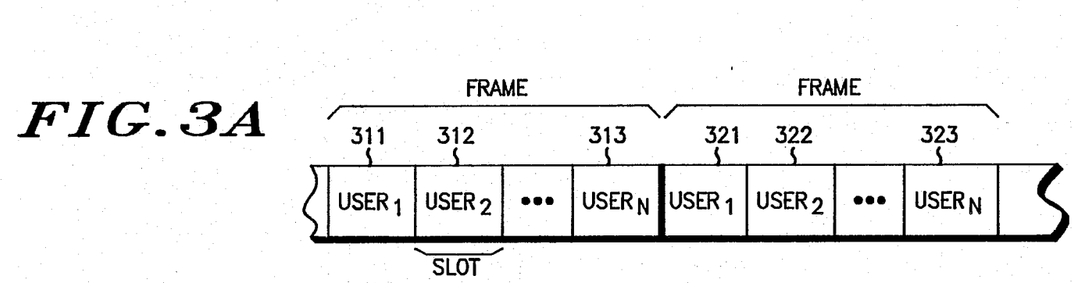
FIG. 3a is a timing diagram illustrating the frame and slot time relationships of the transmitted TDM signal.

The received TDMA signal at 225 is then applied to data buffer 230 as well as to TDMA controller 240. Data buffer 230 serves to store at least a portion of a particular user message in response to control signal 242 for further processing at a later time, which facilitates the use of lower speed signal processing. As will be more fully described in FIG. 3, only one (or several out of many) time slots are normally received by a particular receiving station. Hence, if the adaptive equalization process is performed in non-real time, i.e., the time subsequent to the particular user's time slot, then signal processing devices having a lower data rate may be implemented in any particular receiving station. Data buffer 230 may be implemented by any appropriate data storage device, such as a shift register or random-access memory (RAM). If this "non-real time processing" aspect of the present invention is not desired, data buffer 230 would be omitted such that received TDM signal 225 would then be routed directly to equalizer 250.

TDMA controller 240 serves to de-multiplex the received TDMA signal 225 to select one (or several out of many) predetermined user slot of the received time slots, and hence, selecting a particular user message from other user messages. Upon receipt of a valid TDMA $sync_{1-N}$ word in the received signal which corresponds to the particular user's TDMA $sync_A$ signal available on line 246, TDMA controller 240 outputs a detect clock signal on line 242 as well as a data clock signal on line 244. Detect clock 242 serves to clock in at least the sync word and user data word portions of the received TDMA signal during the proper time slot into data buffer 230. Data clock 244 serves to clock data out of buffer 230 through equalizer 250, and out of the receiving station as $user_A$ data at 255. Refer to FIG. 4 for further details of these clock signals.

Equalizer 250 performs time-delay spread equalization of the stored user message at 235 (or, alternatively, received TDMA signal 225), and outputs a particular user's data word at 255 without the overhead sync words. Prior to equalization of the user data message, the equalizer sync word portion (e.g., 332 of FIG. 3b) of a particular time slot (e.g., 312 of FIG. 3a) is used to adapt the equalizer to compensate for the multipath characteristics of the channel. The equalizer utilizes TDMA control signals 242 and 244 to determine precisely when to perform the equalizer adapt function and the equalization process itself. The equalizer is adaptive only during the time when TDMA controller 240 detects the presence of the desired equalizer synchronization word, or during the corresponding period of time when the data buffer is being read by the equalizer.

Thus, equalizer 250 compensates for the distortions in the received signal due to intersymbol interference and/or Rayleigh fading by performing a continuous, detailed measurement of the multipath characteristics using the information obtained from the equalizer sync word, and equalizes the received signal in accordance with these characteristics. The equalizer may be of the linear type, e.g., a transversal filter, or of the non-linear type, e.g., a decision feedback equalizer. A representative transversal filter equalizer is described in the article, "A Communication Technique for Multipath Channels" by R. Price and P. E. Green, Jr., *Proc. I.R.E.*, Vol. 46, pp. 555–70, March 1958. A representative decision feedback equalizer is described by D. D. Falconer, in the article entitled "Application of Passband Decision Feedback Equalization in Two-Dimensional Data Communication Systems", *IEEE Transactions on Communications*, Vol. COM-24, pp. 1159–66, October 1976. Still further, a detailed block diagram of the equalization circuit of the present embodiment is described in FIG. 4b.

Referring now to FIG. 3a, the TDMA signal format on a single RF channel is illustrated as would be seen at transmitting (base) station antenna 160. A TDMA signal received by the base station would appear similar except that a guard time (336 of FIG. 3b) would probably not be used, and a slot synchronization word (331 of FIG. 3b) may not be present. For N users, N time slots make up a single frame time. This is illustrated in FIG. 3a as individual user time slots 311, 312, . . . 313, for $user_1$, $user_2$, . . . $user_N$, respectively. The entire TDMA frame repeats after the N-th user, as shown by time slots 321, 322, and 323. For an RF channel having a data rate of 300 kbps, and for a system having ten users, a representative frame time would be 8 to 20 milliseconds (msec), and a typical slot time would be 0.8–2.0 msec.

Figure 3B:
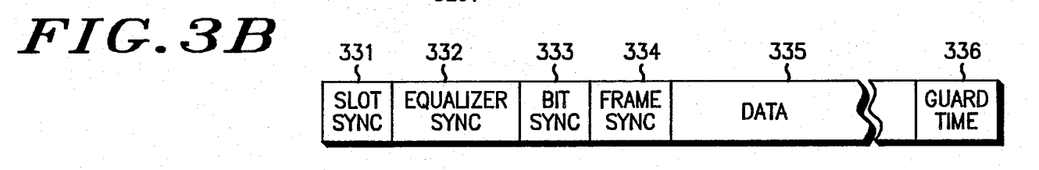
FIG. 3b is a timing diagram illustrating the synchronization-word/data-word format according to the TDMA system of the preferred embodiment.

FIG. 3b illustrates the synchronization/data format used in the preferred embodiment. The six information fields illustrated in FIG. 3b represent a single user time slot such as time slot 312 of FIG. 3a. Each of the six fields are described below:

1. Slot Synchronization Field 331—identifies the user slot number to the remote receiver. This field ensures that each remote user receives (and transmits) in their preassigned time slots. For example, $user_2$ may have a slot sync number of 0010 (binary). A 4–16 bit field could be used in a system having 10 user slots per frame.

2. Equalizer Synchronization Field 332—is used to train the adaptive equalizer in the receiving station. This field contains a synchronization word having high auto-correlation and low cross-correlation properties. A replica of this equalizer sync word is stored in the respective receiving station such that a correlation to the received equalizer sync word produces a correlation peak. This permits the multipath characteristics of the channel to be measured. The equalizer sync field in the preferred embodiment would typically contain a 32-bit sync word.

3. Bit Synchronization Field 333—is used to acquire bit or clock synchronization in the receiver. Typically, a dotting pattern, i.e., 101010 . . . , is employed. A phase-locked loop in the clock recovery circuitry of the receiving station locks to this bit pattern to generate a bit clock signal. Typically, the bit synchronization field is 10 bits long.

4. Frame Synchronization Field 334—establishes the beginning of the user data in the individual time slot. Again, a synchronization word having good autocorrelation/cross-correlation properties is used to correlate with a known frame sync word stored in the receiver. Sometimes called the unique word (UW) in TDMA terminology, the frame sync field could be combined with the equalizer sync field in the present invention. Generally, a 6 bit frame sync word is used.

5. User Data Field 335—contains the user's data or digitized speech, control information, error correction information, etc. Typically, this field contains 100-300 bits of data for a 300 kbps system having 10 user time slots per frame.

6. Guard Time Field 336—prevents transmission collisions between two adjacent time slot remote users. This field is blank, i.e., contains no data, for approximately 48 bit locations, for a 300 kbps system utilized within a 15 mile radius.

The guard time allows for varying propagation delays between the transmitting site and the remote receiver. Since the base site establishes all slot timing and control for the system (i.e., serves as a master clock for all the users), the remote users must first determine time slot boundaries through reception of base site transmissions prior to transmitting. In other words, the start of a received time slot is used by the mobile unit to determine when to transmit in its assigned time slot. However, since different mobile users are not at the same location, they may initiate transmissions at different times with respect to the base site time slot reference. This difference in transmission initiation is directly proportional to the one-way propagation delay time difference between the mobiles and the base site. Furthermore, at the base site, the two mobile users are again received at different times with respect to the base site transmission time slot reference. The difference in time slot reception at the base site is now proportional to the two-way propagation delay time difference between the two mobiles. Under certain conditions, the received mobile transmissions may collide in time at the base site due to the differing propagation delays. Thus, the insertion of a guard time between user slots prevents such collisions upon reception at the base site. Note that guard times are only required for base site transmissions. For further discussion of guard time requirements, see the aforementioned Kinoshita, et al. article.

Hence, guard time 336 is designed to prevent collisions between adjacent user time slots transmitted from different locations. By way of illustration, a typical radio system might specify a maximum base-to-remote separation distance of 15 miles, thereby requiring a guard time of:

$$2 \times 15 mi/C = 0.16 \text{ msec}$$

wherein C equals the speed of light in miles per second ($1.86 \times 10^5$ miles per second). This translates to 48 bit positions for a 300kbps data rate. Note, however, that although guard time 336 is shown in FIG. 3b as occurring at the end of the time slot, identical performance may be achieved by moving the guard time to the beginning of each time slot.

The equalizer synchronization field 332 permits operation of the TDMA system in an environment having undesirable delay spread effects. The multipath characteristics of the channel may be assumed to be relatively constant over a very short period of time, e.g., 0.5 msec. Utilizing this assumption, the RF channel may be "sounded" periodically by the equalizer synchronization word, and then used to train the adaptive equalizer to compensate for the multipath effects. Since the remote unit's velocity determines the range over which the RF channel may be assumed to be relatively constant, the following relationship between data rate, user data field length, vehicle speed, and operating frequency may be established:

Data field length (bits) = channel data rate (bps) $\times$ [$A$(degrees)/360] $\times$

[$C$(mph)/$F$(Hz)] $\times$ [1/$V$(mph)]

wherein A is the maximum degree of phase offset which may be tolerated by the mobile user, C is the speed of light ($6.696 \times 10^8$ miles per hour), F is the transmission frequency, and V is the speed of the transmitting vehicle.

For example, in a channel having a 300 kbps data rate, a 900 MHz operating frequency, a vehicle speed of 60 mph, and a maximum phase tolerance of 10°, the user data field must be less than 103 bits long. In many TDMA systems, this maximum user data field length may be too short, i.e., the ratio between the length of user data field 335 and the other five fields 331, 332, 333, 334, and 336, is too small. A shorter data field implies that a higher amount of synchronization overhead is required to transmit a given amount of data. For example, with a 300 kbps channel data rate and N=10 users, a 103 bit user data field length, and a 100 bit overhead, the maximum user data rate is limited to 15.2 kbps. This high overhead requirement is undesirable in a high-capacity TDMA system, since it limits the number of users on the system. Hence, other methods must be investigated to equalize the channel without significantly lowering the data rate.

One known method for maintaining equalization for transmission channels having relatively constant characteristics is described by S. Qureshi, "Adaptive Equalization", *IEEE Communications Magazine*, Vol. 20, No. 2, pp. 9–16, March 1982. This article describes the decision-directed equalization technique in which the received data is used to train the equalizer during receipt of the data field. The method is somewhat effective in maintaining equalization for channels having relatively stable multipath characteristics. However, the technique breaks down when the RF channel exhibits shadow fading and/or high noise conditions, because the signal 235 recovered by the receiver is purely random and thus the decision-directed approach becomes useless. Rapid fading and severe noise conditions are both to be expected in land/mobile radio channels.

Figure 3C:
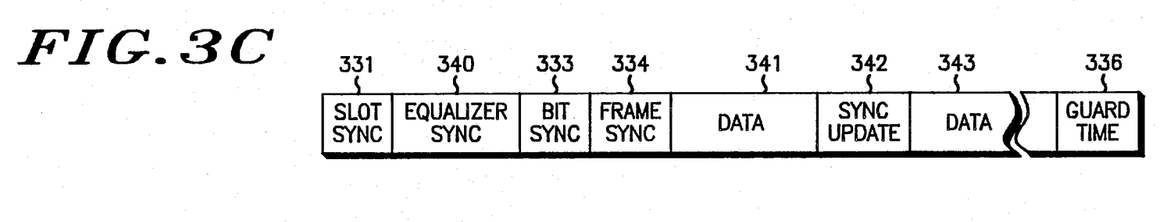
FIG. 3c is a timing diagram illustrating a similar sync-/data format having additional synchronization update words in the user's data field.

The present invention provides an effective solution to the problem of channel equalization under changing multipath conditions. This aspect of the present invention is illustrated in FIG. 3c, which represents a similar sync/data format as shown in FIG. 3b. FIG. 3c is identical to FIG. 3b with the exception that a modified equalizer synchronization scheme is employed.

Rather than repeat the entire overhead sequence containing equalizer sync word 332, an equalizer synchronization update field 342 has now been added between user data field 341 and 343. As the name implies, the equalizer sync update "retrains" the adaptive equalizer such that any changes in the multipath characteristics of the channel are properly accounted for during the transmission of the user data word. Use of the equalizer sync update field permits the transmission of longer user data fields without requiring re-transmission of the slot sync field 331, bit sync field 333, frame sync field 334, or guard time field 336. It should be noted that more than one synchronization update word 342 may be interleaved with the user data to provide equalizer retraining more often for a data field of a given length, or alternatively, to provide a longer user data field. Operation of sync update field 342 is basically the same as that of equalizer sync field 340. However, since the adaptive equalizer has recently been trained by equalizer sync word 340, the equalizer sync update field 342 may be shorter in length, i.e., on the order of 8–16 bits.

Using the same example of a 300 kbps channel data rate, 900 MHz operating frequency, vehicle speed of 60 mph, and maximum phase tolerance of 10°, a 16 bit synchronization update field would permit a plurality of user data fields, each 103 bits long, with the same amount of overhead. If $M=5$ sync update 16 bit words are used, a user data message having a total length of $(M+1)103=618$ bits may be transmitted for each user time slot. Furthermore, if overhead fields 331–334 and 336 occupy a total of 100 bits (as illustrated above), each user time slot would then contain $618+100+90=808$ bits. For a system employing 10 user time slots, a channel data rate of 300 kbps, the user data rate is now 22.9 kbps. Thus for a constant channel rate of 300 kbps and 10 users time slots, the use of additional equalizer sync words within a time slot has resulted in an increase in user data rates (or throughput) from 15.2 kbps to 22.9 kbps.

In contrast to the above examples, in which adaptive equalization was employed, now consider an example of a TDMA system in which adaptive equalization is not employed. From the equation given earlier, for a 5 microsecond delay spread, the maximum data rate over the channel is limited to 40 kbps. For a ten user system employing the slot structure of FIG. 3b less the equalizer sync, the maximum user data rate is limited to less than 4 kbps.

Hence, it can now be seen that the use of adaptive equalization has significantly improved both the maximum channel data rate allowable and the data throughput rate over RF channels experiencing changing multipath characteristics. Furthermore, it can also be appreciated that a further increase in throughput data rate can be achieved through the use of a sync update field.

Figure 4B:
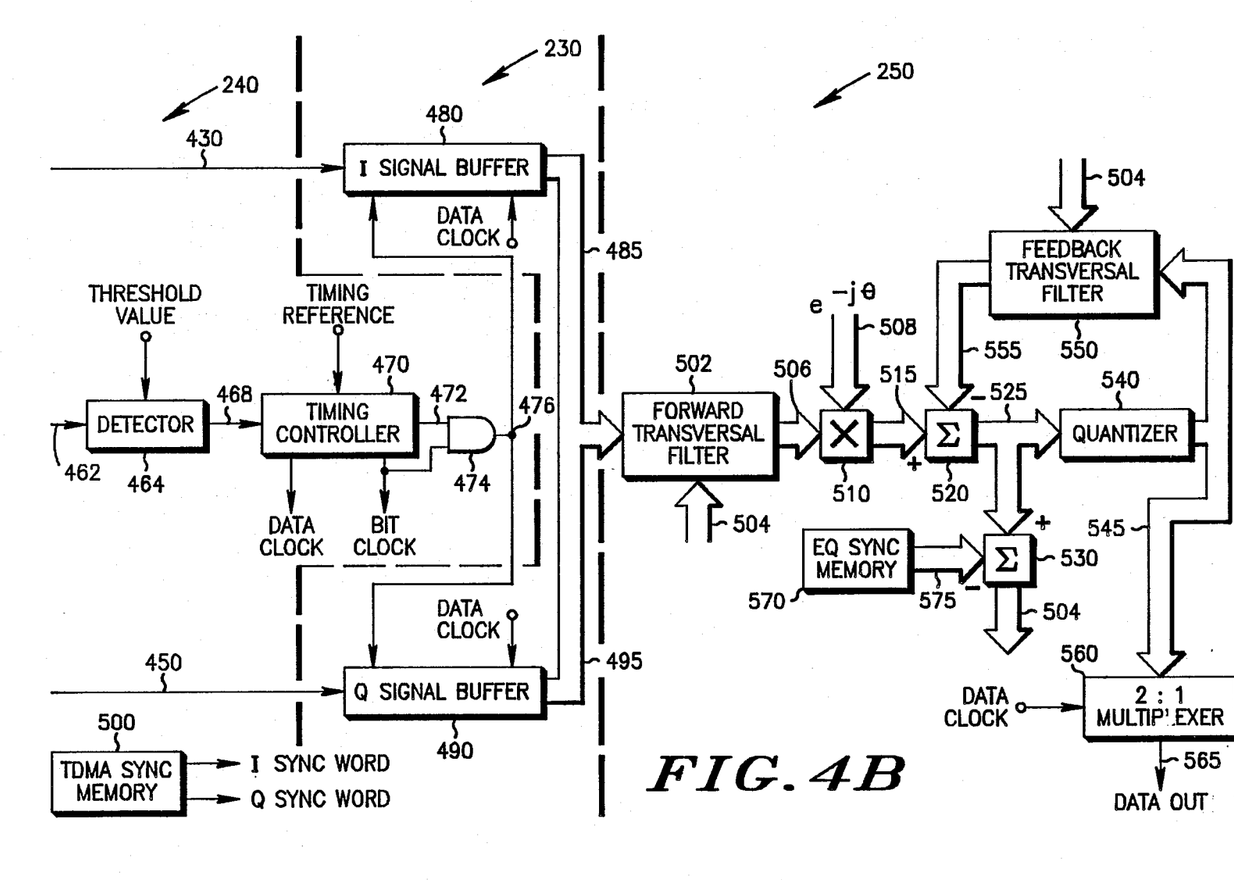

FIGS. 4a and 4b illustrate the TDMA receiving station of FIG. 2 in more detail. Receiving station 400 performs the functions of: receiving the TDMA signal; correlating the received TDMA signal to the predefined TDMA synchronization words stored in memory, and thereby de-multiplexing a particular user message from the others; and equalizing the multipath characteristics of the data word portion of the received TDMA signal in response to the control information derived from this correlation. Furthermore, if the user message of a particular time slot is stored in memory, the adaptive equalization process may be performed during subsequent time slots. This "non-real time equalization" technique gives a significant advantage to a TDMA system, since it obviates the requirement for high speed signal processing capabilities in each TDMA receiver.

More specifically, in the example considered earlier in which 10 time slots were employed in a TDMA system having a 300 kbps channel data rate and a single equalizer sync word, it was shown that the maximum user data rate was 15.2 kbps for a 900 MHz operating frequency at a vehicle speed of 60 mph and with a maximum phase tolerance of 10°. Without using a data buffer, the received signal would need to be processed at the channel rate of 300 kbps. However, by utilizing a data buffer, a single time slot can be processed at the significantly lower rate of 15.2 kbps.

Referring now to FIG. 4a, the transmitted TDMA signal is received at antenna 402, and applied to bandpass filter 406 via line 404. The bandpass filter provides some front-end selectivity to prevent image frequency problems as known in the art. The RF signal at 408 is combined in mixer 410 with the local oscillator signal at 412 which is supplied by local oscillator 414. In practice, local oscillator 414 should be frequency-locked to the received RF signal via an automatic frequency control (AFC) signal.

The resultant intermediate frequency (IF) signal at 416 is applied to IF block 418 to amplify the desired portions of the received signal and to reject undesired adjacent frequency signals. Note that IF block 418 utilizes automatic gain control (AGC) such that the subsequent signal levels are compatible with later-used devices, i.e., such that the signal levels present at lines 426 and 446 fall within the dynamic range of A/D converters 428 and 448

The output signal of IF block 418 is then applied to mixers 420 and 440 to convert the IF signal at 419 to baseband in a quadrature fashion. Quadrature mixing is necessary to preserve both the in-phase (I) and the quadrature-phase (Q) components of the complex received signal. To achieve quadrature mixing, the IF signal is mixed with a cosine signal $cos(\omega+\theta)$ at the IF frequency fIF to derive the in-phase (I) quadrature signal at 422, and mixed with a sine signal $sin(\omega+\theta)$ at the IF frequency fIF to produce the quadrature-phase (Q) signal at 442.

Lowpass filters 424 and 444 serve two functions. First, the lowpass filters remove the double-IF frequency component ($2 \times f_{IF}$) of the output of mixers 420 and 440. Secondly, the lowpass filters act as anti-aliasing filters for proper analog-to-digital conversion. The filtered I and Q signals at 426 and 446 are then applied to analog-to-digital converters 428 and 448, respectively. The sampling rate for the A/D converters is determined by the system timing controller 470 of FIG. 4b, and is illustrated as the bit clock signal. The sampling rate is a multiple (typically 1–8 times) of the channel baud rate.

The digital signal outputs of the A/D converters at 430 and 450, respectively, are applied to in-phase (I) time slot correlator 432 and quadrature (Q) correlator 452, respectively, as well as to their respective signal buffers. I correlator 432 performs a correlation function between all received bits of the input signal and a preloaded synchronization word (I sync word) corresponding to the in-phase time slot sync word 331 of FIG. 3b for the particular time slot. TDMA sync word memory 500 contains the predetermined in-phase (I) time-slot sync word and the quadrature-phase (Q) sync word for the particular user. In practice, a digital correlator such as the IMS A100 Cascadable Signal Processor available from INMOS Corporation could be used to perform the correlation function.

Output 434 of I correlator 432 is a digital bit stream representing the sample-by-sample correlation S(n) of the incoming data R(k) with the stored synchronization word replica $I_i(k)$ at 430 for time slot (i). The correlation relationship is given by:

$$S(n) = \sum_{k=0}^{M-1} R(k) I_i(n + k)$$

where M is the length of the time-slot identifier in bits. The correlation S(n) function exhibits a peak when the I sync word for the i-th time-slot is located in the received sample data. In the same way, Q correlator 452 performs a correlation function between the pre-stored quadrature Q sync word for the i-th time slot from memory 500 and the sampled quadrature (Q) input 450.

Correlation outputs 434 and 454 are applied to squaring blocks 436 and 456, respectively. The squaring block output signals at 438 and 458 represent the squared values of the separate I and Q correlation operations respectively. These squaring block outputs are then applied to summing block 460. The I and Q correlation signals are summed together to form a squared envelope signal which represents the sum of squares of the correlation signal. The squared envelope of the correlation signal makes an explicit determination of the phase ambiguity unnecessary. Thus, without resolving any ambiguity, a large amplitude signal on line 462 represents a possible start location for a particular time slot.

The output 462 of summing block 460 is then routed to time slot detector 464, wherein the summed correlation signal is compared with a predetermined threshold value. This threshold value represents the minimum allowable correlation value which would represent a detected time slot. If the summed output is greater than the threshold value, a time slot detect signal is generated at 468 and applied to system timing controller 470. A representative device which would function as detector 464 would be a comparator such as a Motorola NIC741S6848-bit magnitude comparator IC.

Timing controller 470 functions as a phase-locked loop (PLL), using a stable timing reference to validate the time slot detect signal. Since noise may generate false time slot detect signals, the system timing controller opens a window only at preselected times so as to reject erroneous detect signals which are not spaced at one frame-time apart. Hence, a validated detect signal is output from the timing controller at 472. Timing controller 470 also generates a bit clock signal, which is phase-locked to the transmitted bit rate of the channel; as well as a data clock signal, for clocking data out of the signal buffer at a lower rate which is a function of the number N of users. The validated i-th time slot detect signal at 472 is then applied to AND gate 474 along with the bit clock output. AND'ing these two signals serves to generate an enabled clock signal which is used to clock data into the signal buffer during the i-th time slot. The combined time slot detect/bit clock signal at 476 is then routed to the I and Q signal buffers 480 and 490, respectively.

Three basic equalization modes of the TDMA receiving station are contemplated. In order to receive multiple time slots per frame, it is necessary that the hardware be operated at the full channel data rate, i.e., 300 kbps. This first equalization mode would typically be used at the base station receiver to simultaneously receive all user time slots in a TDMA frame. In this mode, data buffers would not generally be used, since the signal processing is normally performed in real time. It is contemplated, however, that a base site TDMA receiver may utilize the present data buffer technique if it is compatible with system requirements. For example, the technique may be used with multiple digital signal processors, each of which is used to process one time slot per frame.

On the other hand, if the system permits each user to receive only one time slot of each TDMA frame, the data buffers would advantageously be used to store the incoming TDM signal, such that the adaptive equalization signal processing can take place in non-real time. This system format is typical of a remote TDMA station receiver, wherein the i-th user is only receiving his individual message. Storing the received user message permits the signal processing tasks of equalizer training and/or equalization to be spread over all N user time slots in the TDMA frame. Hence, it is no longer necessary that the receiving station hardware be operated at the full channel data rate.

Two additional equalization modes are possible using the data buffering technique of the present invention: both adaptation and equalization in non-real time; and only equalization in non-real time.

In the embodiment shown in FIG. 4, both the adaptation and equalization steps are performed during subsequent time slots. Accordingly, I and Q digital output signals 430 and 450 from the A/D converters are clocked into the appropriate data buffers using the combined detect/bit clock signal at 476. Signal buffers 480 and 490 function as dual-port random-access-memory (RAM) which allows simultaneous reading and writing of data at two different RAM locations. An example of such a RAM is the IDT7130S CMOS Dual-Port RAM manufactured by Integrated Device Technology, Inc. The use of such a buffer permits the writing (inputting) of the received time slot TDMA data at the actual channel data rate, while simultaneously reading (outputting) the received time slot data at the data clock rate which is typically lower. The signal buffers store at least the data portion and equalizer synchronization portion of the incoming user message during the time detect signal 476 is active. Hence, both functions of adaptation (equalizer training) and actual equalization can be performed in non-real time equalization during subsequent user time slots. Performing both functions in non-real time permits a further reduction in the processing rate required.

In a different TDMA system, it may prove desirable to perform only the equalization function in non-real time. Equalization-only in non-real time requires that I and Q signal 430 and 450 be fed to the transversal filter 502 inputs as well as to data buffers 480 and 490 as shown in FIG. 4b. In that case, signal buffers 480 and 490 store the received data portion of the incoming user message for non-real time equalization, while the equalizer adaptation function is performed upon receipt of the received TDMA signal in real time.

The TDMA receiver described herein employs a baseband synchronous decision feedback equalizer (DFE). This type of channel equalization has been successfully utilized on high frequency RF channels experiencing severe amplitude distortion and multipath fading. In a DFE, in-band spectral nulls do not result in noise enhancement by the equalizer, as opposed to the linear equalization (transversal filter) technique. A DFE having T-spaced taps may also be implemented as having fractionally-spaced taps in which multiple samples per bit time are employed in the equalization process. However, this latter scheme requires an increase in computation rate directly proportional to the number of samples per bit.

The DFE basically consists of two parts: a forward linear transversal filter 502 and a feedback linear transversal filter 550. As described below, the forward filter attempts to minimize the mean-square error (MSE) due to intersymbol interference (ISI), while the feedback filter attempts to remove the ISI due to previously detected symbols. (Refer to the previously cited article by Qureshi, p. 13, for further understanding of MSE and ISI.) As an alternative, the equalizer may employ a zero-forcing algorithm to adjust the adaptive coefficients. This latter approach offers faster adaptation of the filter coefficients at the expense of a higher MSE (due to noise) at low signal-to-noise ratios. An example of a complex baseband DFE employing the zero-forcing algorithm is described in the article by C. F. Weaver and D. P. Taylor, "The Implementation of Adaptive Decision Feedback Equalization of Multipath Distortion in Microwave Radio", *IEEE Global Communication Conference*, pp. 48.2.1–2.5, December 1984.

The decision feedback equalizer structure is adapted at least once each time slot during receipt of the equalizer synchronization word in order to compensate for the effects of the time-varying multipath profile. Adaptation consists of minimizing the MSE differences between the received synchronization word and a replica of the transmitted synchronization word which is stored in the receiver. Two basic approaches may be implemented to adjust the DFE filter taps so as to minimize the MSE. The first method, the matrix (or block mode) approach, is described in the article entitled, "Theory of Minimum Mean-Square-Error QAM Systems Employing Decision Feedback Equalization," *Bell System Technical Journal*, Vol. 52, No. 10, pp. 1821–49, December 1973, by D. D. Falconer and G. H. Foschini. However, the matrix approach is considerably more complex than the approach used in the preferred embodiment. This second approach, called the least mean square (LMS) method, is described below in terms of FIG. 4b.

The function of forward transversal filter 502 may be described by the equation:

$$Q(n) = \sum_{k=1}^{X} W(k) WR(k-n)$$

where Q(n) is the complex output of the filter at 506, X is the number of filter coefficients of filter 502, W(k) is the k-th complex filter coefficient, and R(n) is the complex input signal 485 and 495 available from the signal buffers. Forward transversal filter 502 is updated using the LMS update technique per the equation:

$$W_k(n+1) = W_k(n) - \beta E^*(n) R(n), k \epsilon [1, X]$$

wherein $\beta$ is the adaptation coefficient of forward transversal filter 502, and E(n) is the error signal 504.

Multiplication block 510 serves as a phase rotation described by the equation:

$$Z(n) = e^{-j\theta(n)} Q(n)$$

wherein Z(n) is the complex phase-rotated signal at 515 rotated by the phase $\theta$ at 508. The phase 508 is updated by the equation:

$$\theta(n+1) = \theta(n) - \alpha Im \left[ e^{-j\theta(n)} E^*(n) \sum_{k=-X}^{X} W^*(n) R(n-k) \right]$$

wherein $\theta(n)$ is the phase rotation factor, and $\alpha$ is the phase adaptation constant.

Summation block 520 performs the function of subtracting feedback signal 555 from the forward (phase-rotated) signal at 515. The function of feedback transversal filter 550 may be described by the equation $$D(n) = \sum_{k=1}^{Y} B(k) A(k-n)$$

wherein D(n) is the feedback signal 555, Y is the number of filter coefficients of filter 550, A(n) is the quantizer output 545, and B(k) are the complex feedback filter coefficients, which are updated by the equation:

$$B_k(n+1) = B_k(n) - \gamma E^*(n) A(n), k \epsilon [1, Y]$$

wherein $\gamma$ is the feedback transversal filter adaptation coefficient.

The output 525 of summation network 520 is the equalized complex signal C(n), which is applied to quantizer block 540 and summation network 530. Block 540 serves to quantize the complex data values into binary values representative of digital bits 0 or 1 for each of the I and Q channels. Summation network 530 is used to derive E(n), the complex error signal available at 504, by the equation:

$$E(n) = C(n) - F(n)$$

wherein C(n) is the equalized complex signal 525, and F(n) is the complex representation of the in-phase and quadrature synchronization words available from equalizer sync word memory 570

The equalized and quantized complex data at 545 is then applied to multiplexer 560 for 2:1 multiplexing together and output as an output data word at 565. The 2-to-1 multiplexing is necessary for the quadrature correlation/equalization scheme used in the preferred embodiment. Multiplexer 560 utilizes the data clock signal available from timing controller 470 for this task. In the alternative embodiment described above wherein signal buffers 480 and 490 are not used, an optional data buffer may be added to the data output at 565 to perform the data rate changing function.

In review, method and means have been shown for allowing RF land/mobile data communications at transmission rates in excess of those normally allowed by the multipath characteristics of the channel. According to the present invention, the transmitting station of the TDMA communication system formats the user's data such that the receiving station can equalize the time delay spread characteristics of the data word portion of the message each time the equalizer sync word portion of the data message is received in each user time slot. According to another aspect of the invention, it has been shown that additional equalizer synchronization update words may be inserted into the user's data word itself to achieve an even higher data throughput, such that the receiving station equalizes the data message more than once per user time slot. According to a further aspect of the present invention, a data buffer is utilized to store the first user message portion of the received TDMA signal such that the adaptive equalization process may be performed in non-real time, i.e., the time subsequent to the actual reception of the user message portion of the transmitted TDMA signal.

While only particular embodiments of the invention have been shown and described herein, it will be obvious that further modifications may be made without departing from the invention in its broader aspects. For example, in an alternative system, an analog correlation scheme may be employed. In that case, I and Q correlators 432 and 452 would be replaced by analog correlators employing, for example, surface acoustic wave (SAW) technology as described by M. G. Unkauf, "Surface Wave Devices in Spread Spectrum Systems," *Surface Wave Filters*, H. Matthews, Editor, New York, Wiley, 1977. In the analog correlation scheme, quadrature signals I and Q at 426 and 446 are applied directly to the correlators without prior analog-to-digital conversion. Similarly, elements 436, 456, 460 and 464, would be implemented in an analog fashion.

Accordingly, the appended claims are intended to cover all such changes and alternative constructions that fall within the true scope and spirit of the invention.

What is claimed is:

1. A time division multiple access (TDMA) communication system comprising:
    a transmitting station including
        means for interleaving a plurality of first predetermined synchronization words with a plurality of first data words to form a first user message;
        means for multiplexing said first user message with at least one other user message to form a TDMA signal;
        means for transmitting said TDMA signal; and a receiving station including
        means for receiving said transmitted TDMA signal;
        means for de-multiplexing said first user message from said other user message of said received TDMA signal, thereby generating a TDMA control signal; and
        means for equalizing the time delay spread characteristics of the first user message data word portions of said received TDMA signal in response to said TDMA control signal at least the first time the plurality of predetermined synchronization word portions of said first user message are received.

2. The TDMA communication system according to claim 1, wherein subsequent synchronization words of said plurality of first predetermined synchronization words are comprised of a fewer number of bits than the first predetermined synchronization word, said subsequent synchronization words functioning as sync update words.

3. The TDMA communication system according to claim 2, wherein said sync update words exhibit a word length of less than one-half of the length of said first synchronization word.

4. The TDMA communication system according to claim 1, wherein said equalizing means includes means for adapting the time delay spread parameters of said equalizing means in response to the reception of each of said first predetermined synchronization word portions of said de-multiplexed first user message.

5. The TDMA communication system according to claim 4, further comprising means for storing the first user message portion of said received TDMA signal in response to said TDMA control signal.

6. The TDMA communication system according to claim 5, wherein said equalizing means equalizes the time delay spread characteristics of the data word portion of said stored user message at least during the time subsequent to receiving said first user message portion of said transmitted TDMA signal.

7. The TDMA communication system according to claim 6, wherein said equalizing means performs both the adaptation and the equalization functions at least during the time subsequent to receiving said first user message portion of said transmitted TDMA signal.

8. A time division multiple access (TDMA) communication receiving station for receiving a transmitted TDMA signal having a first user message time-multiplexed with at least one other user message, said first user message having a plurality of first predetermined synchronization words interleaved with a plurality of first data words, said receiving station comprising:
    means for receiving said transmitted TDMA signal;
    means for de-multiplexing said first user message from said other user message of said received TDMA signal, thereby generating a TDMA control signal; and
    means for equalizing the time delay spread characteristics of the first user message data word portions of said received TDMA signal in response to said TDMA control signal at least the first time the plurality of predetermined synchronization word portions of said first user message are received.

9. An equalization circuit for reducing the multipath interference distortion in a time division multiple access (TDMA) communication receiving station adapted to receive a transmitted TDMA signal having a first user message time-multiplexed with at least one other user message, said first user message having a plurality of first predetermined synchronization words interleaved with a plurality of first data words, said equalization circuit comprising:
    means for de-multiplexing said first user message from said other user message of said received TDMA signal, thereby generating a TDMA control signal; and
    means for equalizing the time delay spread characteristics of the first user message data word portions of said received TDMA signal in response to said TDMA control signal at least the first time the plurality of predetermined synchronization word portions of said first user message are received.

10. A method of reducing the multipath interference distortion in a time division multiple access (TDMA) communication system comprising the steps of:
    interleaving a plurality of first predetermined synchronization words with a plurality of first data words to form a first user message;
    multiplexing said first user message with at least one other user message to form a TDMA signal;
    transmitting said TDMA signal from a transmitting station;
    receiving said transmitted TDMA signal in a receiving station;
    de-multiplexing said first user message from said other user message of said received TDMA signal, thereby generating a TDMA control signal; and
    equalizing the time delay spread characteristics of the first user message data word portions of said received TMA signal in response to said TDMA control signal at least the first time the plurality of predetermined synchronization word portions of said first user message are received.

11. A method of reducing the multipath interference distortion in a time division multiple access (TDMA) communication receiving station adapted to receive a transmitted TDMA signal having a first user message time-multiplexed with at least one other user message, said first user message having a plurality of first predetermined synchronization words interleaved with a plurality of first data words, said method comprising the steps of:
de-multiplexing said first user message from said other user message of said received TDMA signal, thereby generating a TDMA control signal; and
equalizing the time delay spread characteristics of the first user message data word portions of said received TDMA signal in response to said TDMA control signal at least the first time the plurality of predetermined synchronization word portions of said first user message are received.

12. A time division multiple access (TDMA) communication system comprising:
a transmitting station including
means for formatting a first predetermined synchronization word with a first data word to form a first user message;
means for multiplexing said first user message with at least one other user message to form a TDMA signal;
means for transmitting said TDMA signal; and a receiving station including
means for receiving said transmitted TDMA signal;
means for de-multiplexing said first user message from said other user message of said received TDMA signal; thereby generating a TDMA control signal;
means for storing the first user message portion of said received TDMA signal in response to said TDMA control signal; and
means for equalizing the time delay spread characteristics of the data word portion of said stored user message at least during the time subsequent to receiving said first user message portion of said transmitted TDMA signal.

13. The TDMA communication system according to claim 12, wherein said formatting means includes means for interleaving a plurality of said first predetermined synchronization words with segments of said first data word to form said first user message.

14. The TDMA communication system according to claim 13, wherein subsequent synchronization words of said plurality of first predetermined synchronization words are comprised of a fewer number of bits than said first predetermined synchronization word, said subsequent synchronization words functioning as sync update words.

15. The TDMA communication system according to claim 14, wherein said sync update words exhibit a word length of less than one-half of the length of said first synchronization word.

16. The TDMA communication system according to claim 14, wherein said interleaving means repetitively interleaves one of said sync update words at least every 0.3 milliseconds.

17. The TDMA communication system according to claim 12, wherein said TDMA signal is transmitted at a channel data rate of at least 250 kbps.

18. The TDMA communication system according to claim 12 wherein said receiving means includes coherent detection means for providing a first in-phase signal path and a second quadrature signal path.

19. The TDMA communication system according to claim 12, wherein said equalizing means is a complex signal decision feedback equalizer.

20. The TDMA communication system according to claim 12, said equalizing means is a digital signal processor having a maximum signal processing rate which is exceeded by the bit rate of said transmitted TDMA signal.

21. The TDMA communication system according to claim 12, wherein said equalizing means includes means for adapting the time delay spread parameters of said equalizing means in response to the reception of each of said first predetermined synchronization word portions of said de-multiplexed first user message.

22. The TDMA communication system according to claim 21, wherein said equalizing means performs both the adaptation and the equalization functions at least during the time subsequent to receiving said first user message portion of said transmitted TDMA signal.

23. A time division multiple access (TDMA) communication receiving station for receiving a transmitted TDMA signal having a first user message time-multiplexed with at least one other user message, said first user message having a first predetermined synchronization word formatted with a first data word, said receiving station comprising:
means for receiving said transmitted TDMA signal;
means for de-multiplexing said first user message from said other user message of said received TDMA signal, thereby generating a TDMA control signal;
means for storing the first user message portion of said received TDMA signal in response to said TDMA control signal; and
means for equalizing the time delay spread characteristics of the data word portion of said stored user message at least during the time subsequent to receiving said first user message portion of said transmitted TDMA signal.

24. An equalization circuit for reducing the multipath interference distortion in a time division multiple access (TDMA) communication receiving station adapted to receive a transmitted TDMA signal having a first user message time-multiplexed with at least one other user message, said first user message having a first predetermined synchronization word formatted with a first data word, said equalization circuit comprising:
means for de-multiplexing said first user message from said other user message of said received TDMA signal, thereby generating a TDMA control signal;
means for storing the first user message portion of said received TDMA signal in response to said TDMA control signal; and
means for equalizing the time delay spread characteristics of the data word portion of said stored user message at least during the time subsequent to receiving said first user message portion of said transmitted TDMA signal.

25. A method of reducing the multipath interference distortion in a time division multiple access (TDMA) communication system comprising the steps of:

formatting a first predetermined synchronization word with a first data word to form a first user message;

multiplexing said first user message with at least one other user message to form a TDMA signal;

transmitting said TDMA signal from a transmitting station;

receiving said transmitted TDMA signal in a receiving station;

de-multiplexing said first user from said other user message of said received TDMA signal, thereby generating a TDMA control signal;

storing the first user message portion of said received TDMA signal in response to said TDMA control signal; and equalizing the time delay spread characteristics of the data word portion of said stored user message at least during the time subsequent to receiving said first user message portion of said transmitted TDMA signal.

26. A method of reducing the multipath interference distortion in a time division multiple access (TDMA) communication receiving station adapted to receive a transmitted TDMA signal having a first user message time-multiplexed with at least one other user message, said first user message having a first predetermined synchronization word formatted with a first data word, said method comprising the steps of:

de-multiplexing said first user from said other user message of said received TDMA signal, thereby generating a TDMA control signal;

storing the first user message portion of said received TDMA signal in response to said TDMA control signal; and equalizing the time delay spread characteristics of the data word portion of said stored user message at least during the time subsequent to receiving said first user message portion of said transmitted TDMA signal.

27. A method of reducing the multipath interference distortion in a time division multiple access (TDMA) communication system comprising the steps of:

interleaving a plurality of first predetermined synchronization words with a plurality of first data words to form a first user message;

multiplexing said first user message with at least one other user message to form a TDMA signal;

transmitting said TDMA signal from a transmitting station;

receiving said transmitted TDMA signal in a receiving station;

de-multiplexing said first user message from said other user message of said received TDMA signal, thereby generating a TDMA control signal;

adapting the time delay spread parameters of an equalizing means in response to the reception of each of said first predetermined synchronization word portions of said de-multiplexed first user message; and equalizing the time delay spread characteristics of the first user message data word portion of said received TDMA signal in response to said TDMA control signal.

28. A method of reducing the multipath interference distortion in a time division multiple access (TDMA) communication system comprising the steps of:

formatting a first predetermined synchronization word with a first data word to form a first user message;

multiplexing said first user message with at least one other user message to form a TDMA signal;

transmitting said TDMA signal from a transmitting station;

receiving said transmitted TDMA signal in a receiving station;

de-multiplexing said first user from said other user message of said received TDMA signal, thereby generating a TDMA control signal;

storing the first user message portion of said received TDMA signal in response to said TDMA control signal;

adapting the time delay spread parameters of an equalizing means in response to the reception of each of said first predetermined synchronization word portions of said de-multiplexed first user message; and equalizing the time delay spread characteristics of the data word portion of said stored user message in response to said TDMA control signal at least during the time subsequent to receiving said first user message portion of said transmitted TDMA signal.

* * * * *

UNITED STATES PATENT AND TRADEMARK OFFICE
CERTIFICATE OF CORRECTION

PATENT NO. : 4,852,090

DATED : 7/25/89

INVENTOR(S) : Borth, David E.

It is certified that error appears in the above-identified patent and that said Letters Patent is hereby corrected as shown below:

In the Abstract, line 15, "throughout" should be --throughput--.

Col. 2, line 57, "See" should be --(See--.

Col. 5, line 12, "channel" should be --channel.--.

Col. 7, line 61, "300kbps" should be --300 kbps--.

Col. 10, line 30, "448" should be --448.--.

Col. 10, line 37, "cos(w+θ)" should be --cos(wt+θ)--.

Col. 10, line 38, "fIF" should be --$f_{IF}$--.

Col. 10, line 39, "sin(w+θ)" should be --sin(wt+θ)--.

Col. 10, line 40, "fIF" should be --$f_{IF}$--.

Col. 11, line 41, "N1C741S6848-bit" should be --MC74LS684 8-bit--.

Col. 12, line 41, "rate which" should be --rate, which--.

Col. 13, line 10, "mean-square error" should be --mean-square-error--.

Col. 16, line 67, "TMA" should be --TDMA--.

Col. 18, line 2, "12" should be --12,--.

Col. 19, line 11, between the words "user" and "from", insert therefor --message--.

Col. 19, line 31, between the words "user" and "from", insert therefor --message--.

Col. 20, line 31, between the words "user" and "from", insert therefor --message--.

UNITED STATES PATENT AND TRADEMARK OFFICE
CERTIFICATE OF CORRECTION

PATENT NO. : 4,852,090

DATED : 07/25/89

INVENTOR(S) : Borth, David E.

It is certified that error appears in the above-identified patent and that said Letters Patent is hereby corrected as shown below:

Col. 20, line 31, between the words "user" and "from", insert therefor --message--.

Signed and Sealed this

Second Day of April, 1991

*Attest:*

HARRY F. MANBECK, JR.

*Attesting Officer*   *Commissioner of Patents and Trademarks*